L. M. PERKINS.
SYSTEM OF CONTROL.
APPLICATION FILED NOV. 16, 1917.
1,374,521.
Patented Apr. 12, 1921.
2 SHEETS—SHEET 1.
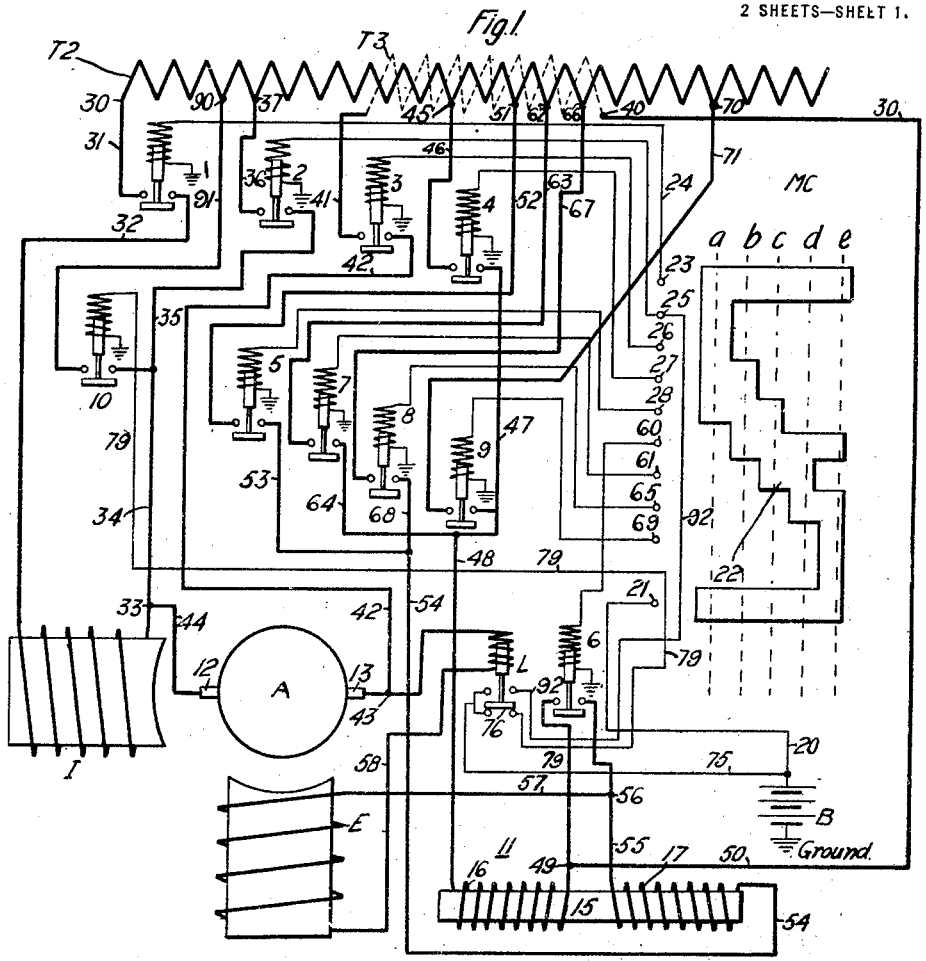
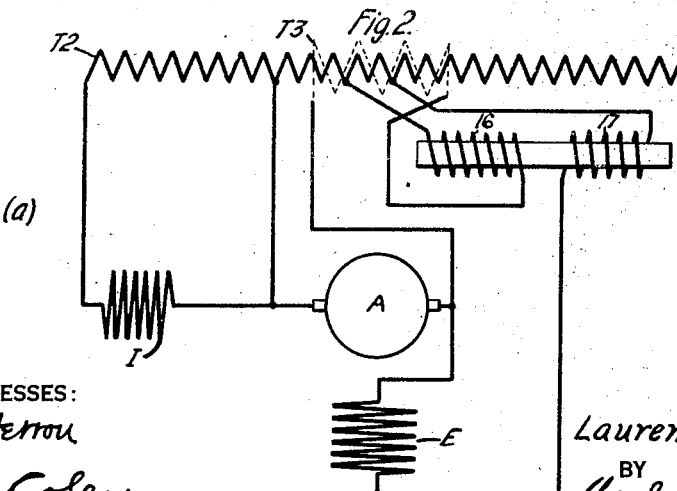
WITNESSES:
Ed. V Herron
W. R. Coley
INVENTOR
Laurence M Perkins
BY
Wesley E Carr
ATTORNEY L. M. PERKINS.
SYSTEM OF CONTROL.
APPLICATION FILED NOV. 16, 1917.
1,374,521.
Patented Apr. 12, 1921.
2 SHEETS—SHEET 2.
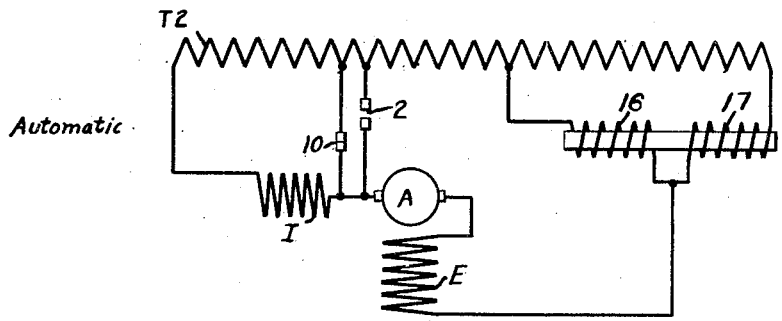
Automatic
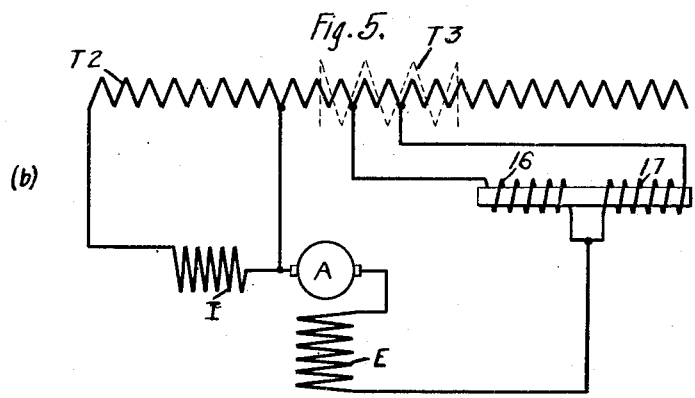
Fig. 5.
(b)
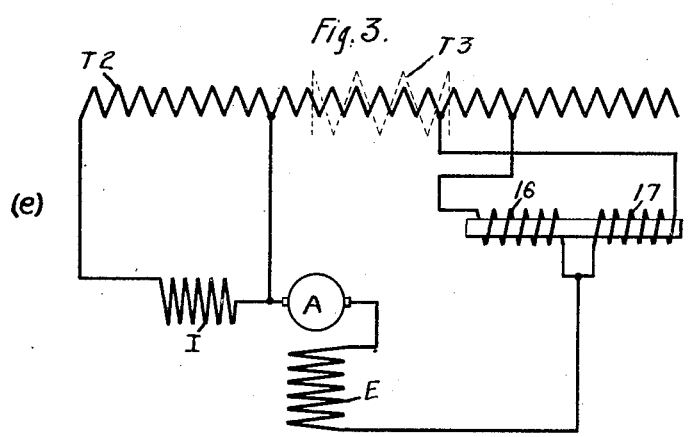
Fig. 3.
(e)
Fig. 4.
WITNESSES:
Ed. V. Herron
W. R. Coley
INVENTOR
Laurence M. Perkins
BY
Wesley G. Carr
ATTORNEY

UNITED STATES PATENT OFFICE.

LAURENCE M. PERKINS, OF SWISSVALE, PENNSYLVANIA, ASSIGNOR TO WESTING-HOUSE ELECTRIC & MANUFACTURING COMPANY, A CORPORATION OF PENNSYLVANIA.

SYSTEM OF CONTROL.

1,374,521.  Specification of Letters Patent.  Patented Apr. 12, 1921.

Application filed November 16, 1917. Serial No. 202,313.

*To all whom it may concern:*

Be it known that I, LAURENCE M. PERKINS, a citizen of the United States, and a resident of Swissvale, in the county of Allegheny and State of Pennsylvania, have invented a new and useful Improvement in Systems of Control, of which the following is a specification.

My invention relates to systems of control for dynamo-electric machines, especially of the single-phase commutator type.

When starting motors of the above-indicated character, except on very low-frequency systems, it is necessary to reduce the exciting field strength in order to prevent excessive sparking at the commutator brushes by reason of the transformer action of the pulsating exciting flux upon the coils short-circuited by the brushes. The desired result has been accomplished in the prior art by connecting the exciting field winding in series with the customarily provided inducing field winding during the starting period, and the exciting field winding has subsequently been changed over to the armature circuit upon the attainment of a predetermined speed sufficient to reduce the bad effects of the above-mentioned transformer action by reason of the compensating voltage that is induced in the short-circuited coils by the rotation thereof through the flux that is created by the inducing field winding. In many cases, the number of turns in the inducing field winding is equal to approximately twice the number of turns upon the armature, and, consequently, although the above-mentioned starting connection of the exciting field winding will produce the desired result, it has certain disadvantages, such as definitely fixing the ratio of transformed voltage between the inducing field winding and the armature and, furthermore, it causes the exciting field current to be out of phase with the armature current, thus reducing the starting torque for a given value of current.

The object of my present invention is to provide a relatively simple and inexpensive control system for single-phase commutator motors, wherein the above-mentioned reduction of exciting-field-winding strength, at starting, and the maintenance of desired phase relations are readily accomplished by the use of auxiliary apparatus, namely, a preventive coil of the type that is customarily employed in systems of the class in question.

Other objects of my invention will become evident from the subsequent detailed description, and, are set forth with particularity in the appended claims.

My invention may best be understood by reference to the accompanying drawings, wherein Figure 1 is a diagrammatic view of a combined main-circuit and auxiliary-circuit control system that is organized in accordance with the present invention; and Fig. 2 to Fig. 5, inclusive, are simplified diagrammatic views serving to illustrate various main-circuit connections during the operation of the motor.

Referring to Fig. 1 of the drawings, the system shown comprises a suitable derived source of energy, such as a secondary winding T2 of a transformer, for supplying energy to a single-phase motor having a commutator-type armature A; a main or exciting field winding E; and a compensating or inducing field winding I. A plurality of switches 1 to 10, inclusive, that are electrically governed from a suitable master controller MC, may be energized from a battery B, or other source of auxiliary energy, for governing the main circuits in the desired sequence. A double-coil preventive device 11 is provided for the customary function of preventing a short-circuit of the transformer turns during the various transitional connections of the motor circuits. An auxiliary secondary transformer winding T3 is preferably provided for use in connection with the motor-starting, in a manner to be set forth, and a limit switch or current relay L is also provided for the purpose of automatically varying the voltage inductively impressed upon the armature by the inducing field winding under full-speed operating conditions.

The motor armature A is provided with two brushes 12 and 13 per pole, the machine being shown as of the two-pole type for the sake of simplicity and clearness, and the conventional arrangements of the exciting field-winding and the inducing field winding being shown. It will be understood, however, that the motor field windings are preferably distributed around a laminated stator core, in accordance with a familiar practice, rather than being wound upon salient polar projections of the type illustrated.

The preventive device 11 may be of any well-known construction and is shown as comprising a magnetizable core member 15 and a plurality of normally independent coils 16 and 17 which may be connected in series relation through the agency of switch 6.

Assuming that it is desired to effect acceleration of the motor, the master controller may be actuated to its initial operative position $a$, whereupon an auxiliary circuit is established from the positive terminal of the battery B through conductor 20, control finger 21, contact segment 22, and control finger 23 of the master controller, whence circuit is completed, through conductor 24 and the actuating coil of the switch 1, to ground or any other suitable return conductor to which the negative pole of the battery B is also connected. The contact segment 22 further engages control fingers 25, 26, 27 and 28, whereby switches 2, 3, 4 and 5 are closed in a similar manner.

The main circuits completed in position $a$ of the master controller are illustrated in a simplified manner in Fig. 2 and may be traced in Fig. 1, as follows: from the left-hand terminal 30 of the secondary transformer winding T2, a circuit is established through conductor 31, switch 1, conductor 32, inducing field winding I, junction-point 33, conductors 34 and 35, switch 2 and conductor 36, to an intermediate tap-point 37 of the secondary transformer winding. The inducing field winding I is thus connected across a predetermined section of the secondary transformer winding T2.

Another main circuit is established at this time from the right-hand terminal 40 of the auxiliary secondary transformer winding T3, through that winding, conductor 41, switch 3, conductor 42, junction-point 43, armature A and conductor 44, to the junction-point 33, whence circuit is continued to the secondary transformer winding tap-point 37, as previously traced, circuit being completed from this point through a section of the secondary winding to another intermediate point 45, through conductor 46, switch 4, conductors 47 and 48, left-hand coil 16 of the preventive device 11, junction-point 49, and conductor 50 to the right-hand terminal 40 of the auxiliary secondary transformer winding T3. By reason of the peculiar differential or negative arrangement of the auxiliary transformer winding, a materially reduced voltage is impressed upon the armature terminals, such relatively low voltage being necessary to provide proper speed conditions in conjunction with the weakening of the exciting field strength, as is well known. The purpose of the illustrated arrangement of transformer windings will become evident from the subsequent description of the control system.

An exciting circuit is established from another intermediate tap-point 51 of the secondary transformer winding, through conductor 52, switch 5, conductors 53 and 54, the right-hand coil 17 of the preventive device 11, conductor 55, junction-point 56, conductor 57, exciting field-winding E, conductor 58, and the actuating coil of the limit switch L, to the junction-point 43 with the armature circuit.

Since the switch 6 is initially in the open condition, the coils 16 and 17 of the preventive device 11 are electrically independent or disconnected, and the connection of the coil 17 in series-circuit relation with the exciting field winding E, reduces the strength thereof to any desired value, dependent upon the design of the preventive device, which determines the portion of the armature current that traverses the exciting field-winding. In this way, the above-mentioned reduction of exciting field-winding strength is produced during starting operation of the motor, while maintaining the exciting-field-winding current substantially in phase with the armature current to produce maximum-torque conditions.

In position $b$ of the master controller, control finger 60 is energized from the contact segment 22 to close the switch 6, and control fingers 25 and 26 become disengaged from the contact segment 22 to effect the opening movement of switches 2 and 3. In this way, the straight "doubly-fed" or "transformer-conduction" connection that is shown in Fig. 3 is obtained, the auxiliary secondary transformer winding T3 being excluded from circuit, while the armature and the exciting field winding are connected through switches 4 and 5 and the preventive coils 16 and 17 across a predetermined section of the secondary transformer winding T2. The closure of switch 2 or switch 10 during the remaining motor operation is dependent upon the limit switch L, as hereinafter more fully described, both of these switches being shown in Fig. 5.

It will be observed that the movable connection of the armature circuit to the secondary transformer winding has not been shifted, although a relatively large increase of voltage is impressed upon the armature circuit by reason of the removal of the negatively-acting auxiliary transformer winding T3 from circuit. In this way, the desired increase of armature voltage, after the motor has been set into operation and the change to straight "doubly-fed" connection is made, is provided without requiring the use of a long section of, or large step along, the secondary transformer winding, which would otherwise be necessary. By the construction just recited, the necessary size of preventive coil and number of switches are reduced from what would be necessary if a single transformer winding to provide the desired current capacity and voltage steps were used.

In position *c* of the master controller, control finger 27 is deënergized to allow switch 4 to open, while control finger 61 is energized to effect the closure of switch 7. Consequently, another intermediate tap-point 62 of the secondary transformer winding is connected through conductor 63, switch 7, conductors 64 and 48, left-hand preventive coil 16, junction-point 49, switch 6, junction-point 56, conductor 57, exciting field winding E, conductor 58, actuating coil of the limit switch L, and junction-point 43 to the right-hand armature brush 13. In this way, a further step of voltage is impressed upon the armature circuit to increase the motor speed, in accordance with a familiar practice.

In position *d*, control finger 28 is deënergized to cause switch 5 to open, while control finger 65 is energized from the contact segment 22 to effect the closure of switch 8, whereby another tap-point 66 of the secondary transformer winding is connected through conductor 67, switch 8, conductors 68 and 54, right-hand preventive coil 17 and conductor 55 to junction-point 56, whence circuit is completed through the exciting field-winding and the armature, as previously traced. In this way, a predetermined increase of voltage is impressed upon the armature circuit to further increase the motor speed.

When the master controller is actuated to its position *e*, control finger 61 is deënergized to allow switch 7 to open, and a new control finger 69 is energized, whereby the switch 9 is closed to connect another tap-point 70 of the secondary transformer winding through conductor 71, switch 9, conductor 48 and the left-hand preventive coil 16 to switch 6, whence circuit is completed through the exciting field-winding and the armature, as already set forth. Since the switch 8 remains closed in position *e* of the master controller, a voltage increase, corresponding to one-half of the voltage difference between the tap-points 66 and 70, is impressed upon the armature circuit and the motor is thus accelerated to full-speed operation. The simplified main-circuit connections at this period are illustrated in Fig. 4.

At all times, automatic control of the inducing-field-winding voltage, in accordance with current conditions, as registered by the limit switch L, is effected. As previously mentioned, the function of the limit switch is to vary the voltage impressed upon the inducing field-winding I from the transformer winding T2, whereby the voltage that is induced by rotation of the armature conductors in the inducing field flux may be adjusted to neutralize the voltage induced by the exciting field-winding through transformer action in the armature coils short-circuited by the brushes, the arrangement of parts being such that an increase of exciting field-current is accompanied by the impression of an increased voltage upon the inducing field-winding, whereby commutating conditions are changed to satisfactorily meet the heavy-current conditions in the exciting field-winding. Conversely, when the exciting field-current reaches a certain lower value, it is desirable to reduce the compensating-field-winding voltage to improve commutating conditions in the machine.

The auxiliary circuits for effecting the desired automatic operation may be traced as follows: assuming that the limit switch L occupies its illustrated lower position, corresponding to a certain decrease of exciting field-current, a circuit is established from the positive terminal of the battery B, through conductor 75, movable contact member 76 of the limit switch L, in its lower position, conductor 79, and the actuating coil of the switch 10 to ground. The closure of the switch 10 completes a circuit from a lower-voltage intermediate tap-point 90 of the secondary transformer winding T2, through conductor 91, switch 10 and conductor 34, to the inner terminal of the inducing field winding I, whereby a suitably decreased voltage is impressed upon the inducing field winding, for the purpose set forth.

On the other hand, when the limit switch L occupies its upper position corresponding to a predetermined increase of exciting field current, an auxiliary circuit is continued from the positively-energized conductor 75, through the coöperating contact members of the limit switch L in its upper position, conductor 92, and control finger 25 of the master controller, whence circuit is completed through the actuating coil of the switch 2, whereby the original connection of the inducing field-winding to the transformer is restored to effect the desired increase of inducing-field-winding strength. The relative location of the switches 2 and 10 is illustrated in a simplified manner in Fig. 5.

I do not wish to be restricted to the specific circuit connections or arrangement of parts herein set forth, as various modifications therefor may be made within the spirit and scope of my invention. I desire, therefore, that only such limitations shall be imposed as are indicated in the appended claims.

I claim as my invention:

1. In a system of control, the combination with a transformer winding and a single-phase commutator motor having an armature and an exciting field winding, of an inductive device, means for connecting said device in circuit to prevent short-circuits of said transformer winding during motor acceleration, means for connecting said inductive device in series relation with a section of said transformer winding and with said field winding to reduce the strength thereof for starting, and switching means for subsequently connecting the armature in series relation with the field winding to increase the strength thereof for running conditions.

2. In a system of control, the combination with a transformer winding and a single-phase commutator motor having an armature and an exciting and an inducing field winding, of an inductive device, means for connecting said device in circuit to prevent short-circuits of said transformer winding during motor acceleration, and means for connecting said device in series relation with said exciting field winding and for connecting the inducing field winding across a section of the transformer winding for starting to weaken the exciting field strength while maintaining the exciting field-winding current substantially in phase with the armature current.

3. In a system of control, the combination with a transformer winding and a single-phase commutator motor having an armature and an exciting field winding, of an inductive device having a plurality of initially electrically independent coils, means for connecting said device in circuit to prevent short-circuits of said transformer winding during motor acceleration, and means for connecting said coils in series relation with said field winding and with said armature, respectively, for starting.

4. In a system of control, the combination with a main transformer winding and a single-phase commutator motor having an armature and an exciting field winding, of an auxiliary transformer winding, an inductive device, means for connecting said auxiliary transformer winding in circuit with said armature differentially to said main transformer, and means for connecting said inductive device in circuit with said field winding.

5. In a system of control, the combination with a main transformer winding and a single-phase commutator motor having an armature and an exciting field winding, of an auxiliary transformer winding, an inductive device, means for connecting said auxiliary transformer winding in series relation with said armature and with a portion of said main transformer winding, the two transformer windings being differentially related, and for connecting said inductive device in series relation with said field winding for starting, and means for eliminating said auxiliary transformer winding and for connecting the armature in series relation with the field winding for running conditions.

6. In a system of control, the combination with a main transformer winding and a single-phase commutator motor having an armature and an exciting field winding, of an auxiliary transformer winding, a preventive device having a plurality of initially electrically independent coils, means for connecting said auxiliary transformer winding in series relation with said armature and with a portion of said main transformer winding, the two transformer windings being differentially related, and for connecting one of said coils in series relation with said field winding for starting, and means for eliminating said auxiliary transformer winding and for connecting the armature in series relation with the field winding across a portion of the main transformer winding for running conditions.

In testimony whereof I have hereunto subscribed my name this 30th day of Oct., 1917.

LAURENCE M. PERKINS.